US008787897B2

(12) United States Patent
Khosravi (10) Patent No.: US 8,787,897 B2
(45) Date of Patent: *Jul. 22, 2014

(54) CALL NOTE MANAGEMENT ON COMMUNICATION DEVICE

(71) Applicant: Research in Motion Limited, Waterloo (CA)

(72) Inventor: Bardia Khosravi, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/855,045

(22) Filed: Apr. 2, 2013

(65) Prior Publication Data

US 2013/0225244 A1 Aug. 29, 2013

Related U.S. Application Data

(63) Continuation of application No. 12/711,323, filed on Feb. 24, 2010, now Pat. No. 8,412,174.

(60) Provisional application No. 61/250,652, filed on Oct. 12, 2009.

(51) Int. Cl.
*H04M 3/00* (2006.01)

(52) U.S. Cl.
USPC ........................ 455/418; 455/414.2

(58) Field of Classification Search
USPC ................ 455/418, 414.2, 415, 414.1, 566; 379/142.01, 88.21
See application file for complete search history.

(56) References Cited

U.S. PATENT DOCUMENTS

| | | | |
|---|---|---|---|
| 6,442,251 B1 | 8/2002 | Maes et al. | |
| 6,795,429 B1 | 9/2004 | Schuster et al. | |
| 7,440,748 B2 | 10/2008 | Matsumoto et al. | |
| 2003/0148753 A1 | 8/2003 | Pappalardo et al. | |
| 2005/0243979 A1 | 11/2005 | Starbuck et al. | |
| 2006/0088143 A1 | 4/2006 | Tapaninen | |
| 2008/0057927 A1 | 3/2008 | Han | |
| 2012/0015638 A1* | 1/2012 | Bocking et al. | 455/415 |

OTHER PUBLICATIONS

PCT International Search Report—Jan. 11, 2011.
PCT Written Opinion of the International Searching Authority—Jan. 11, 2011.
"Best Call Notes" smart phone application—http://www.smartphoneware.com/callnotes-for-s60-5th-edition-product.php; Oct. 8, 2009.

(Continued)

*Primary Examiner* — Phuoc H Doan
(74) *Attorney, Agent, or Firm* — Ridout & Maybee LLP (57) ABSTRACT

Displaying call note information on a communication device having stored thereon telephone call log information identifying telephone calls made to or from the communications device, the telephone call log information including the time and date of the telephone calls, wherein associated call note data is stored on the communications device for at least some of the telephone calls, including: detecting an input at the communication device requesting display of a call note history; and displaying on a display of the communication device, after detecting the input, a call note history list that lists telephone calls from the telephone call log information that have associated call note data stored on the communications device, wherein the telephone calls in the call note history list are listed according to the time and date of the telephone calls.

18 Claims, 6 Drawing Sheets

(56) References Cited

OTHER PUBLICATIONS

"Call Logs +" smart phone application—http://software.palm.com/us/html/display_palun_product.jsp?id=prod1960558; Oct. 11, 2007.

"Call Notes" for Blackberry—http://www.berryreview.com/2008/06/24/call-notes-add-call-notes-to-your-calendar-or-tasks/; Jun. 24, 2008.

BBGeeks, BlackBerry News, Reviews and Information—"How to take notes on a BlackBerry during a phone call" posted by Rae on Jan. 3, 2008.

Extended European Search Report dated Jun. 25, 2010 in connection with corresponding EP Application No. 10154478.1.

* cited by examiner

CALL NOTE MANAGEMENT ON COMMUNICATION DEVICE

CROSS-REFERENCE TO RELATED APPLICATIONS

This application is a continuation of U.S. patent application Ser. No. 12/711,323 filed Feb. 24, 2010. U.S. application Ser. No. 12/711,323 claims priority from U.S. provisional application No. 61/250,652 filed Oct. 12, 2009. The contents of both documents are hereby incorporated herein by reference.

FIELD

The present disclosure relates to call note management on phone enabled communication devices.

BACKGROUND

Communication devices such as smart phones are available that allow users to take and save electronic notes during a phone conversation.

DESCRIPTION OF THE FIGURES

Example implementations are illustrated in the attached Figures in which.

DESCRIPTION OF EXAMPLE IMPLEMENTATIONS

Call note management on phone enabled communication devices is described. One or more methods and devices to allow access to notes taken during a telephone call on phone enabled communication devices are described herein according to example implementations.

According to one example implementation is a method for displaying call note information on a communication device having stored thereon telephone call log information identifying telephone calls made to or from the communications device, the telephone call log information including the time and date of the telephone calls, wherein associated call note data is stored on the communications device for at least some of the telephone calls. The method includes detecting an input at the communication device requesting display of a call note history; and displaying on a display of the communication device, after detecting the input, a call note history list that lists telephone calls from the telephone call log information that have associated call note data stored on the communications device, wherein the telephone calls in the call note history list are listed according to the time and date of the telephone calls.

According to another example implementation is a communication device enabled to make and receive telephone calls over a communications network, including: a memory storing telephone call log information identifying telephone calls made to or from the communications device including the time and date of the telephone calls, and associated call note data for at least some of the telephone calls; a display; a user input device; and a processing unit coupled to the memory, display, and user input device, the processing unit being configured for: detecting an input at the communication device requesting display of a call note history; and displaying on the display, after detecting the input, a call note history list that lists telephone calls from the telephone call log information that have associated call note data stored in the memory, wherein the telephone calls in the call note history list are listed according to the time and date of the telephone calls.

According to another example implementation is a method for displaying information about call notes for telephone calls on a communication device that is enabled for making and receiving phone calls and sending and receiving electronic messages, the communication device having stored thereon telephone call log information identifying telephone calls made to or from the communications device, and associated call note data for at least some of the telephone calls. The method includes displaying on a display of the communication device a message list identifying both telephone calls to and from the communication device and electronic messages sent from and received by the communication device, wherein the telephone calls identified in the message list that have associated call note data stored on the communication device are marked with a visual indicator to indicate the existence of the call note data.

According to another example implementation is a communication device enabled to make and receive telephone calls and send and receive electronic messages, including: a memory storing information identifying telephone calls made to or from the communications device and electronic messages sent from or to the communication device, and associated call note data for at least some of the telephone calls; a display; a user input device; a processing unit coupled to the memory, display, and user input device, the processing unit being configured for: displaying on the display a message list identifying both telephone calls to and from the communication device and electronic messages sent from and received by the communication device, wherein the telephone calls identified in the message list that have associated call note data stored in the memory are marked with a visual indicator to indicate the existence of the call note data.

Figure 1:
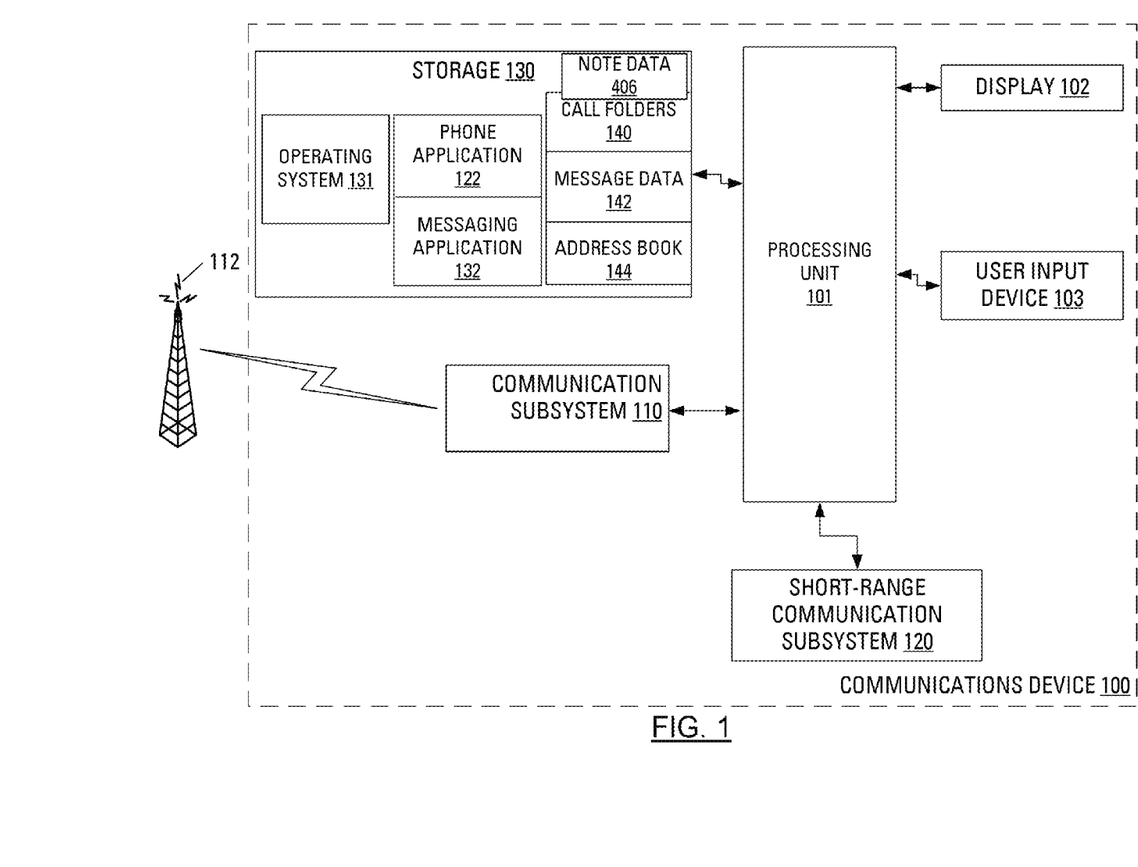
FIG. 1 shows a block diagram of a representative communication device to which a call note management system may be applied according to example implementations disclosed herein.

Referring now to FIG. 1, an overview of an example of a communication device 100 on which the solutions described herein can be applied will now be provided. Implementations described herein are not limited to any particular communications architecture, operating system, or system architecture. In an example implementation the mobile communication device 100 is a phone enabled device able to initiate and receive mobile phone calls through a communications network 112. Communications network 112, in example implementations, may comprise one or more or combinations of a Wireless Wide Area Network (WWAN), a Wireless Local Area Network (WLAN), the Internet, personal networks, enterprise networks and public switched telephone networks, as well as other types of communications networks. In some implementations, the mobile communication device 100 is configured to communicate over both WWANs and WLANs and to roam between these networks.

A WWAN may be implemented as any suitable wireless access network technology and is typically operated by a mobile network service provider that provides subscription packages to users of the mobile communication devices 100. In some implementations, a WWAN conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. Although a WWAN is described as a "Wide-Area" network, that term is intended herein also to incorporate wireless Metropolitan Area Networks (WMAN) and other similar technologies for providing coordinated service wirelessly over an area larger than that covered by typical WLANs.

A WLAN may for example comprise a wireless network which, in some implementations, conforms to IEEE 802.11x standards (sometimes referred to as Wi-Fi) such as, for example, the IEEE 802.11a, 802.11b and/or 802.11g standard). Other communication protocols may be used for WLANs in some implementations such as, for example, IEEE 802.11n, IEEE 802.16e (also referred to as Worldwide Interoperability for Microwave Access or "WiMAX"), or IEEE 802.20 (also referred to as Mobile Wireless Broadband Access). A WLAN may include one or more wireless RF Access Points (AP) that collectively provide a WLAN coverage area. The WLAN may be a personal network of the user, an enterprise network, or a hotspot offered by an internet service provider (ISP), a mobile network provider, or a property owner in a public or semi-public area, for example.

In the example implementation, the communication device 100 is a two-way communications device having data and voice communication capabilities, and the capability to communicate with other computer systems, for example, via the public internet. Depending on the functionality provided by the mobile communication device 100, in various implementations the communication device 100 may be, by way of example but not limitation, a data communication device, a multiple-mode communication device configured for both data and voice communication, a mobile telephone, a PDA (personal digital assistant) enabled for wireless communication, a smart phone, a laptop computer with a network interface such as a wireless modem, or a land-line based phone.

In some implementations, the communication device 100 is a handheld electronic device which includes a rigid case (not shown) for housing components of the device 100 and is configured to be held with one or two hands while the device 100 is in use. In some implementations, the communication device 100 is small enough to fit inside a purse or coat pocket or belt mounted holster.

In an example implementation, the communication device 100 includes a wireless communication system 110 that includes one or more communication sub-systems for communicating with wireless base stations of a WWAN or wireless access points of a WLAN within the communications network 112. The particular design of the wireless communication subsystem 110 depends on the network 112 in which mobile communication device 100 is intended to operate. The mobile communication device 100 includes a controller or processing unit 101 which controls the overall operation of the mobile communication device 100. The processing unit 101 interacts with the communication subsystem 110 which performs communication functions. The processing unit 101 may be implemented by way of one or more suitably programmed microprocessors.

The processing unit 101 also interacts with additional device subsystems which may include but are not limited to a display device 102, user input devices 103, storage 130 and short range communications system 120. The display device 102 may be, for example, a liquid crystal display (LCD) or other suitable display. The input devices 103 may include for example one or more of a keyboard or keypad, a navigational device such as a clickable scroll wheel (also referred to as a track wheel or thumbwheel) or trackball, a microphone, a touch sensitive display screen and an accelerometer. The storage 130 of the mobile communication device 100 may include, for example, one or more memory devices including for example a random access memory (RAM), flash memory, read only memory (ROM), a hard disk drive (HDD), or other type of digital data storage. The storage 130 may be used to store data that is local to the mobile electronic device such as message data 142 for email messages and call folders 140 which include information about phone calls made to and by the communications device 100. In example implementations, short-range communications system 120 enables mobile communications device 100 to exchange messages over a short-range wireless communication pico area network (PAN) interface with suitable configured devices, and may for example include a Bluetooth™ interface.

The processing unit 101 operates under stored program control and executes software modules stored in the storage 130. The software modules may comprise operating system software 131 and software applications. The software modules or parts thereof may be temporarily loaded into volatile memory such as RAM of the storage 130.

The software applications may include a range of applications, including, for example, an address book application, messaging applications 132 including for example email messaging and SMS or other text messaging applications, a phone application 122, a calendar application, and/or a notepad application.

Figure 2:
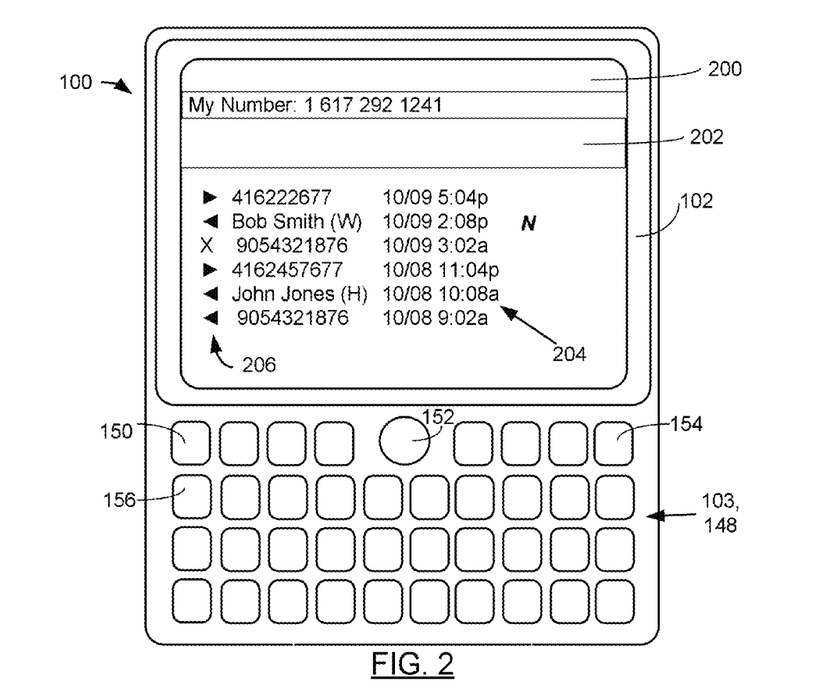
FIG. 2 is an illustrative front view of the communication device of FIG. 1 having displayed on its display a main phone application user interface screen.

In one example implementation, the phone application 122 enables the communication device 100 to initiate and receive phone calls through communications network 112. In this regard, FIG. 2 through shows an example of a main phone application user interface screen 200 displayed on a display 102 of the communication device 100. In the example of FIG. 2, the user input device 103 includes a keypad 148 which may for example be one or both of a physical keypad with physical user press-able buttons or a virtual keypad with user selectable buttons displayed on a touch screen display. In some example implementations other forms of user input such as verbal input or device motion input may be used to control the communications device 100 to achieve the functionality described herein.

The main phone application user interface screen 200 may for example be displayed by the processing unit 101 operating under instructions from phone application 122 in response to a user input event or combination of user input events received through user input device 103. For example, user input device 102 may include a include a dedicated phone button 150 which when pressed or otherwise selected by a user results in main phone application user interface screen 200 being displayed.

In the illustrated implementation main phone application user interface screen 200 includes a phone number input field 202 in which a user can use user input device 103 to enter a phone number and initiate a phone call to that number. Main phone application user interface screen 200 also includes a call history log 204 that displays a historical list of past calls that may for example be identified as incoming, outgoing or incoming missed phone calls by respective call icons 206 (in the illustrated example, ▶ represents incoming, ◀ represents outgoing and X represents missed incoming). Depending on the information associated with the calls and the content of address book data 144 stored in the storage 130 of the communication device 100, the call history log 204 may identify the calls by phone number or caller name or both, and include a date and time of the call. At least some of the call log information used by the phone application 122 to populate main phone application user interface screen 200 is stored in call folders 140, which in at least some example implementations are stored on device storage 130, although in some implementations some or all of the content of call folders 140 could be remotely stored and accessed through communications network 112. In an example implementation, call folders 140 include time and date information and call identifying information for phone calls listed in the call history log 204, and the call folders 140 may for example be divided into incoming call, outgoing call and missed call folders.

Figure 3:
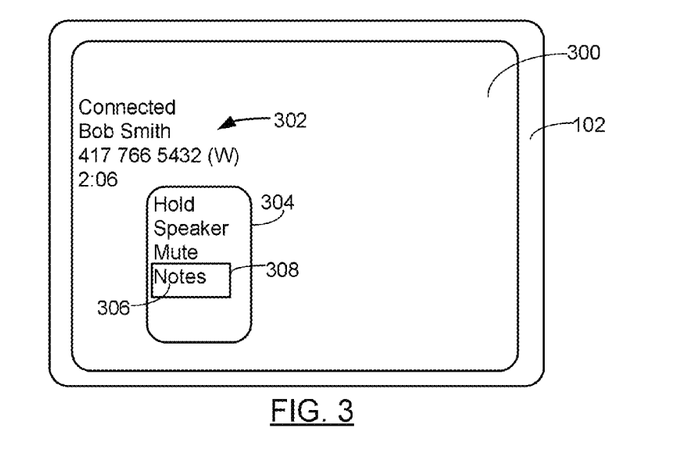
FIG. 3 shows an example of an connected call user interface screen displayed on the communication device.

A user of the communication device 100 can initiate a phone call using the main phone application user interface screen 200. As well, other interface screens and combinations of user inputs may also allow a device user to initiate an outgoing phone call to an intended party. Additionally, the communication device 100 can receive incoming phone calls which a device user can cause the communication device 100 to answer using one or more predetermined user inputs. In this regard, FIG. 3 illustrates an example of a connected call user interface screen 300 that phone application 122 causes to be displayed on a display 102 of the communication device 100 when the device 100 is connected in an active phone call session (which may for example be either an incoming or outgoing phone call). The user interface screen 300 may for example include current connected call information 302 such as the name and phone number of the party associated with the communications device on the other end of the call (e.g. Bob Smith, 417 766 5432) and the current duration of the call (e.g. 2:06). If the phone number is associated in address book data 144 with a particular communication device of the other part—for example a work phone, home phone or cell phone, that information may also be included in the connected call information 302 (e.g. (W)). In the illustrated example, a menu list 304 of user selectable items is displayed in the user interface screen, including for example a "Hold" item, a "Speaker" item, a "Mute" item and a "Notes" item 306, each of which are associated with a predetermined function. More or fewer items could be displayed in the menu list 304. The menu list 304 could be displayed automatically as part of the connected call user interface screen 300, or may by displayed in response to one or more predetermined user input events—for example user selection of a control button 156 or user depression of a trackball 152 (FIG. 2) could result in the menu list 304 being displayed as a drop-down menu with an on-screen marker 308 that can be moved in response to user input events to focus and select among the listed items. In an example implementation employing a user input device 103 that includes a navigational device such as a trackball 152, on-screen marker 308 can move through the items in the menu list 304 to focus items in response to rolling of the trackball 152 and then a focused item (such as "Notes" item 308) can be selected in response to pressing of the trackball 152. In a touch screen environment for example, touching the screen at the display location of the "Notes" item can focus the item, and depressing the screen with more force can then select the "Notes" item.

Figure 4:
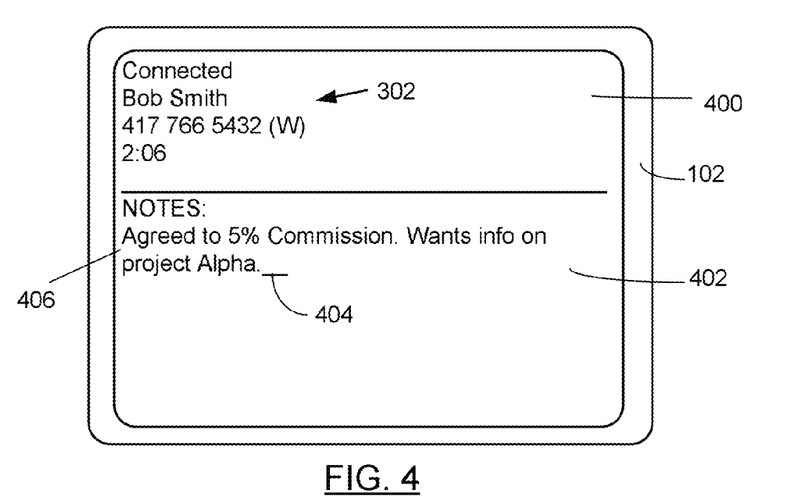
FIG. 4 shows an example of a user interface screen displayed on the communication device for authoring call notes during a phone call.

In an example implementation, a user input event indicating the selection of the "Notes" item results in the phone application 122 launching an in-call note taking process in which the device user is permitted to take notes about the call. In this regard, FIG. 4 illustrates an example of a note entry user interface screen 400 displayed on device display 102 after the in-call note taking process is launched. In the illustrated example the note entry user interface screen 400 includes a notes field 402 in which a user can use user input device 103 to enter call note data 406 in the form of text notes concerning the phone call. A cursor 404 may be displayed in the notes field 402 to show a current entry location in the field. As shown in FIG. 4, in some implementations the note entry user interface screen 400 may be automatically populated with connected call information 302.

The phone application 122 monitors for one or more predefined user input events that indicate a user desire to exit from the note entry user interface screen 400—for example, in one implementation user selection of an escape key 154 is used to signal that the user desires to exit the note entry process. In one example implementation, a user can exit from the note entry user interface screen 400 during a call or wait until after the call ends if the user wishes to continue entering note information after a call ends; if the user exits during the call, the phone application 122 returns to the connected call interface screen 300, and if the user exits after the call ends, the phone application returns to the main phone application user interface screen 200. Either during the call note taking process or upon exiting the call note taking process, the call note data 406 entered by a user into the notes field 402 is stored. In at least one example implementation call note data 406 is stored as part of the call log data for a specific call stored in call folders 140 (see FIG. 1). Thus, the call log data stored for a particular call in a call folder 140 can include one or more of a date and time stamp, duration information, an identifier for call such as a telephone number or name or both, and call note data 406.

Although text is shown in the notes field 402 in FIG. 4, in some example implementations, call note data could include other information—for example, a user may be given the opportunity to record a verbal note after a phone call is completed that is saved as an audio file associated with the call log data. Alternatively, a user may be given an opportunity to take a picture if the communications device 100 is camera enabled, such that the note data includes an image file associated with the call log data.

Figure 5:
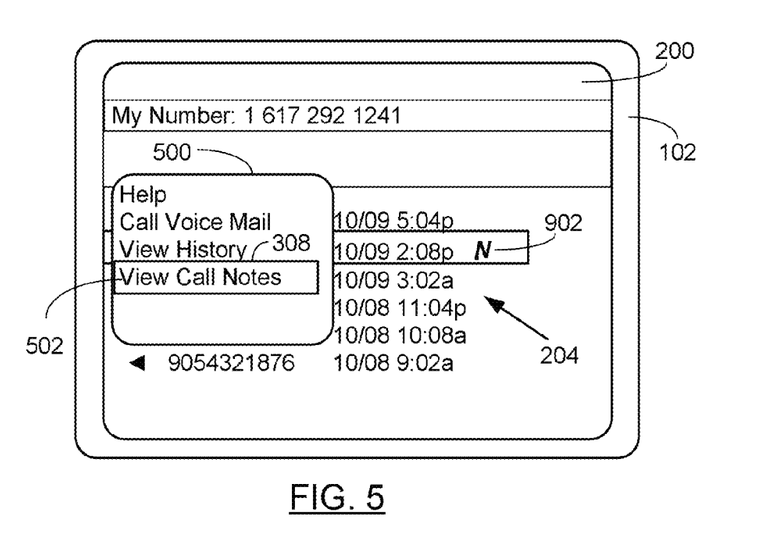
FIG. 5 shows an example of the main phone application user interface screen with a menu list of user selectable items displayed on the communication device.

Having given examples of how call note data 406 can be created, a system for managing call note data will now be described. In this regard, FIG. 5 illustrates an example of the main phone application user interface screen 200, which as noted above includes a call history log 204 that displays a historical list of past calls to and from multiple parties that may for example be identified as incoming, outgoing or incoming missed phone calls. In an example implementation, when the main phone application user interface screen 200 is displayed, phone application 122 monitors for one or more predefined user input events and upon detecting such event(s) causes a menu list 500 of user selectable items that each have an associated function to be displayed. By way of example, in one implementation the menu list 500 is displayed as a drop down menu over other content of the main phone application user interface screen 200 in response to user selection of the control key 156 or user depression of a trackball 152. In the illustrated example the menu list 500 includes items such as "Help" item, "Call Voice Mail" item, "View History" item, and "View Call Notes" item 502, among other things. In the illustrated implementation an on-screen marker 308 is displayed in the menu list 500 and can be moved in response to user input events to focus and select among the listed items. In an example implementation employing a user input device 103 that includes a navigational device such as a trackball 152, on-screen marker 308 can move through the items in the menu list 500 to focus items in response to rolling of the trackball 152 and then a focused item (such as "View Call Notes" item 502) can be selected in response to pressing of the trackball 152. In a touch screen environment for example, touching the screen at the display location of the "View Call Notes" 502 item can focus the item, and depressing the screen with more force can then select the "View Call Notes" item 502.

Figure 6:
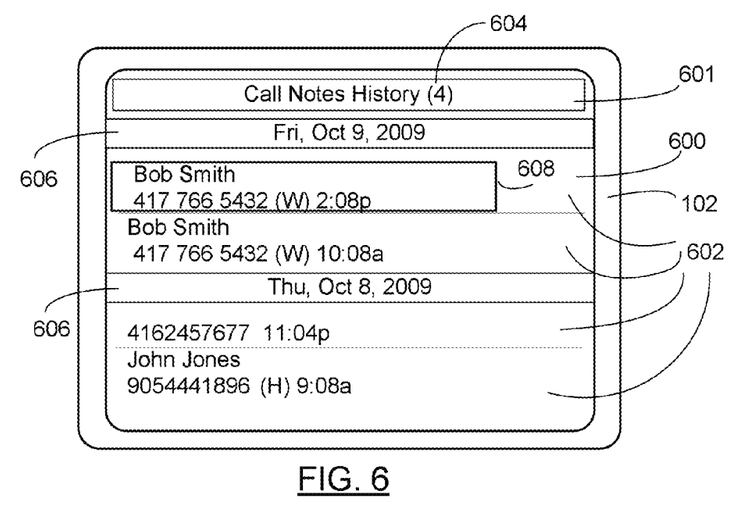
FIG. 6 shows an example of a call notes history user interface screen displayed on the communication device.

In response to user input events indicating selection of the "View Call Notes" item 502, the communications device 100 is configured to display a call notes history user interface screen 600, an example of which is shown in FIG. 6. In an example implementation the call notes history user interface screen 600 includes a list that includes respective list items 602 for only each of the calls in the call history log 204 that has an associated call note. Thus, the call notes history user interface screen 600 includes a list of call items identifying calls to and from multiple parties solely for the calls for which call note data 406 has been stored. As shown in FIG. 6, the call notes history user interface screen 600 includes a header banner 601 that includes a numeric field 604 that identifies the total number of phone calls in the call history log that have call notes (4 in the illustrated example). In the illustrated implementation the call note items 602 are organized in reverse chronological order from most recent to oldest, with date lines 606 separating the call note items from different days. In example implementations, the date lines 606 separate the call note data by the days on which the calls occurred. In some implementations users may be given the option to organize the call note items according to alternative classifying schemes rather than date, such as by name or number of the other party, for example.

In example implementations, the displayed call note items 602 each include some or all of the call identifying and call metrics information from the call log data of the call for which the call note data 406 was created, but do not include the call note data 406 itself. For example, a call note item 602 can include a time of the call (for example the time that the call originated) and one or more call identifiers such as a telephone number or a name of the other party to the call. In some example implementations, part of the call note data 406, for example up to a predetermined number of characters, may be selected up and included in the displayed call note items 602.

In an example implementation, a user can scroll through the list of call note items displayed in the call notes history user interface screen 600. In the illustrated implementation on-screen marker 608 is displayed in the call notes history user interface screen 600 and can be moved in response to user input events to focus and select among the listed call note items 602. In an example implementation employing a user input device 103 that includes a navigational device such as a trackball 152, on-screen marker 608 can move through the call note items 602 to focus items in response to rolling of the trackball 152 and then a focused item (such as "Bob Smith 2:08 p") can be selected in response to pressing of the trackball 152. In a touch screen environment for example, touching the screen at the display location of the item can focus the item, and depressing the screen with more force can then select the desired item 602. The list of calls having associated call note data could be presented to a user in ways other than as particularly shown in the illustrative example of FIG. 6. In example implementations, a user can exit the call notes history user interface screen 600 and return to the main phone application user interface screen 200—for example, in one implementation user input event such as selection of an escape key 154 is used to signal that the user desires to exit and return to the main phone application user interface screen 200.

Figure 7:
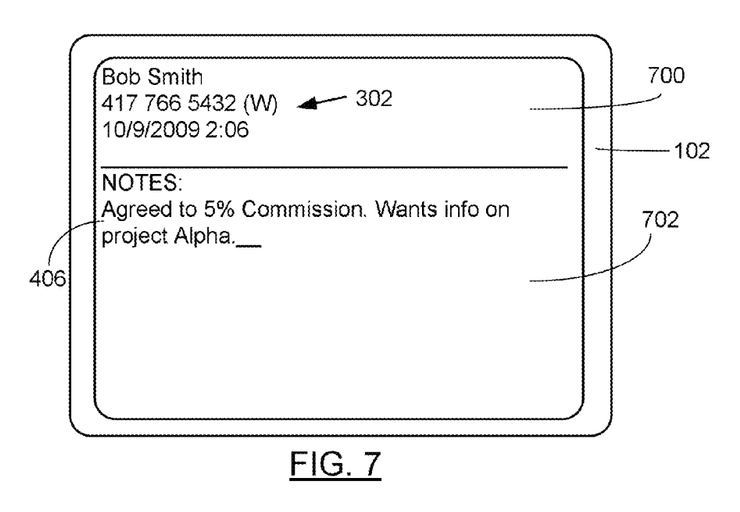
FIG. 7 shows an example of call notes viewing and editing user interface screen displayed on the communication device.

With reference to FIG. 7, in response to user input events indicating selection of a particular call notes item 602, a call note display and editing user interface screen 700 is shown on display 102. In an example implementation, the call note display and editing user interface screen 700 displays the call note data 406 associated with the selected call note history item 602 in a call note field 702. The call note display and editing user interface screen 700 can be similar to the note entry user interface screen 400, and include call information 302 and allow the call note data 406 to be edited and supplemented. The phone application 122 monitors for one or more predefined user input events that indicate a user desire to exit from the call note display user interface screen 400—for example, in one implementation user selection of an escape key 154 is used to signal that the user desires to exit. Any changes to the call note data 406 entered by a user into the notes field 402 is stored.

Figure 8:
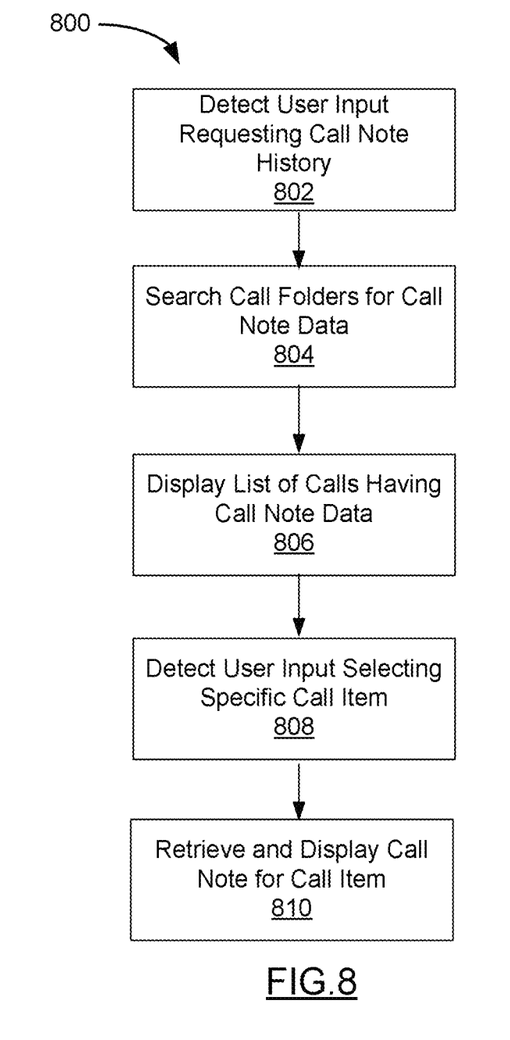
FIG. 8 is a flow diagram illustrating a call notes management process implemented on the communication device according to an example implementation.

FIG. 8 illustrates a process 800 carried out by the processing unit 101 under control of at least the phone application 122 in one example implementation to produce the call note history user interface screen 600 of FIG. 6. In one implementation, call note history process 800 commences upon detecting a user input requesting a call note history (action 802), for example user selection of "view call notes" item 502 (see FIG. 5). After such a request is detected, the processing unit searches the call folders 140 for all calls in the call log history 204 that have associated call note data 406 (action 804)—for example, incoming, outgoing and missed call folders may be searched. Summary call data for such calls (such as date and time and identifying information) is retrieved from the call folders 140 for the calls that have associated call note data and the list of calls is generated and displayed in the form of list items 602 (action 806) (see FIG. 6). In some example implementations, the phone application 122 may pass on the summary call data to other applications such as messaging application 132 to generate the call note history user interface screen 600.

Once the call note history user interface screen 600 is generated, if a user input selecting a particular call note item 602 is detected (action 808), the call note data for the respective call is retrieved and displayed in call note display user interface 700 (action 810) (see FIG. 7).

Figure 9:
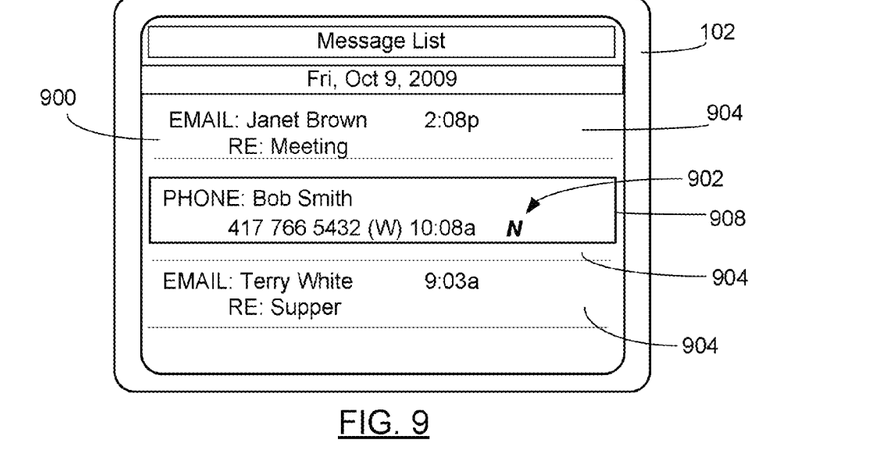
FIG. 9 shows an example of a message list user interface screen displayed on the communication device.
Figure 10:
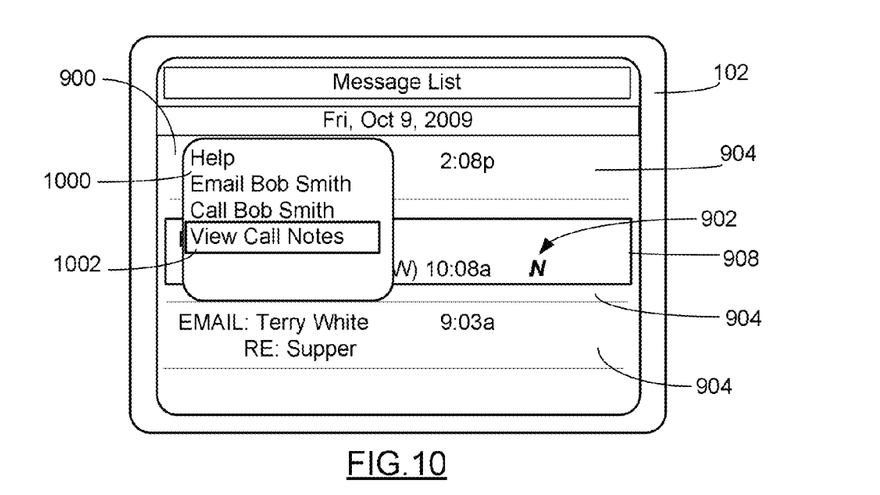
FIG. 10 shows an example of the message list user interface screen of FIG. 9 with a menu list of user selectable items displayed.

Other systems for identifying calls having associated call notes can be used in addition to or in place of the call note display system described above. By way of example, FIGS. 9 and 10 shows a further example of a user interface screen 900 displayed on display 102 of communication device 100. In the example illustrated by FIGS. 9 and 10 a predefined visual indicator such as a "call notes" icon 902 is displayed to mark a call list entry 904 that identifies a call for which a call note exists. In the examples of FIGS. 9 and 10, the communications device 100 is configured to receive and send electronic messages such as email messages in addition to being phone enabled, and upon one or more predefined user input events the processing unit 101 is configured to generate message list user interface screen that includes in reverse chronological order a list of items identifying communication events related to the communications device 100. In the illustrated implementation, the communications events include emails sent to and received by an email account associated with the communications device and phone calls made to or from the device. In some example implementations, communication event items could include electronic messaging events such as text messages. As shown in FIG. 9, each list item 904 identifies the type of communication event (e.g. email or phone) and some identifying information for the event (e.g. name of sending address of email; or phone number or name of other party in the case of a phone call). The telephone list items that identify a phone call having stored call note data 406 are marked with call note icon 902. List items 904 can be individually selected to obtain further information - for example, in some implementations an onscreen marker 908 can be used to focus and select list items 902.

As shown in FIG. 10, in example implementations a drop down menu 1000 is generated over user interface screen 900 in response to predefined user input events to display user selectable items including a "view call notes" item 1002. In some example implementations, user selection of the "view call notes" item 1002 results in call notes history user interface 600 being generated. In some example implementations, user selection of the "view call notes" item 1002 results in display of call notes display user interface screen 700 for a telephone item focused by marker 908.

In some example implementations visual identifiers such as a call note icon 902 can also be included in the call log history 204 (see FIG. 5) to identify phone calls having associated call note data.

It will be appreciated that in at least some example implementations the call note display systems disclosed herein allow a user to quickly and efficiently determine which calls have associated call notes. In at least some circumstances, this can be beneficial not only for a user of a device but also to the operation of the communication device 100 since it may reduce user input events which may otherwise be required to identify, find and view call notes. In some cases, a reduction of user input events may reduce possible damage to and extend the life of the user input devices 103, and may also be beneficial for overall processing efficiency of the communication device 100 as fewer user inputs may need to be processed.

While the present disclosure is primarily described in terms of methods, a person of ordinary skill in the art will understand that the present disclosure is also directed to various apparatus such as a communication device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

The various implementations presented above are merely examples and are in no way meant to limit the scope of this disclosure. Variations of the innovations described herein will be apparent to persons of ordinary skill in the art, such variations being within the intended scope of the present application. In particular, features from one or more of the above-described implementations may be selected to create alternative implementations comprised of a sub-combination of features which may not be explicitly described above. In addition, features from one or more of the above-described implementations may be selected and combined to create alternative implementations comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A method for displaying call note information on a communication device that is enabled for making and receiving telephone calls and sending and receiving electronic messages, the communication device having stored thereon telephone call log information identifying telephone calls made to or from the communication device, and associated call note data for at least some of the telephone calls, the method comprising:
    displaying on a display of the communication device a message list of communication events, the message list identifying both telephone calls to and from the communication device and electronic messages sent from and received by the communication device, wherein the telephone calls identified in the message list that have associated call note data stored on the communication device are marked with a visual indicator to indicate the existence of the call note data,
    detecting an input requesting display of a call note history;
    displaying on the display of the communication device, after detecting the input, a call note history that lists telephone calls from the message list that have associated call note data stored on the communications device; and
    detecting input selecting a telephone call included in the call note history having associated call note data and in response thereto presenting the call note data associated with the selected telephone call.

2. The method of claim 1, wherein the call note data includes text information previously inputted to the communication device and presenting the call note data comprises displaying the text information on the display of the communication device.

3. The method of claim 1, wherein telephone calls on the displayed call note history are listed according to one of: the date and time of the telephone calls, the name of the other party to a telephone call, and the telephone number of the other party to a telephone call.

4. The method of claim 1, wherein the communications events in the message list are listed in reverse chronological order according to the time and date of the communication event.

5. The method of claim 1, wherein the message list includes, for at least some of the list items, information identifying the type of communication event and identifying information for the communication event.

6. The method of claim 5, wherein the identifying information for the communication event includes a name of a sending email address or a telephone number of the other party to a telephone call.

7. The method of claim 1, wherein the call note data is stored in call folders that include folders for incoming and outgoing calls.

8. The method of claim 1, wherein the call note data comprises one or more of text data, audio data and image data.

9. The method of claim 1, wherein telephone calls listed in a call log history with associated call note data stored in memory are marked with a visual indicator to indicate the existence of the call note data.

10. A communication device enabled to make and receive telephone calls and send and receive electronic messages, comprising:
    a memory storing information identifying telephone calls made to or from the communications device and electronic messages sent from or to the communication device, and associated call note data for at least some of the telephone calls;
    a display;
    a user input device;
    a processing unit coupled to the memory, display, and user input device, the processing unit being configured for:
    displaying on a display of the communication device a message list of communication events identifying both telephone calls to and from the communication device and electronic messages sent from and received by the communication device, wherein the telephone calls identified in the message list that have associated call note data stored on the communication device are marked with a visual indicator to indicate the existence of the call note data, detecting an input requesting display of a call note history, displaying on the display of the communication device, after detecting the input, a call note history that lists telephone calls from the message list that have associated call note data stored on the communications device, and detecting input selecting a telephone call included in the call note history having associated call note data and in response thereto presenting the call note data associated with the selected telephone call.

11. The communication device of claim 10, wherein the call note data includes text information previously inputted to the communication device and presenting the call note data comprises displaying the text information on the display of the communication device.

12. The communication device of claim 10, wherein telephone calls on the displayed call note history are listed according to one of: the date and time of the telephone calls, the name of the other party of a telephone call, and the telephone number of the other party of a telephone call.

13. The communication device of claim 10 wherein the communications events in the message list are listed in reverse chronological order according to the time and date of the communication event.

14. The communication device of claim 10 wherein the message list includes, for at least some of the list items, information identifying the type of communication event and identifying information for the communication event.

15. The communication device of claim 14, wherein the identifying information for the communication event includes a name of a sending email address or a telephone number of the other party to a telephone call.

16. The communication device of claim 10, wherein the call note data is stored in call folders that include folders for incoming and outgoing calls.

17. The communication device of claim 10, wherein the call note data comprises one or more of text data, audio data and image data.

18. The communication device of claim 10, wherein telephone calls listed in a call log history with associated call note data stored in memory are marked with a visual indicator to indicate the existence of the call note data.

* * * * *